(12) United States Patent
Krebs et al.

(10) Patent No.: US 11,590,948 B2
(45) Date of Patent: Feb. 28, 2023

(54) FLUID RESERVOIR WITH A STOP VALVE

(71) Applicant: Continental Teves AG & Co. oHG, Frankfurt am Main (DE)

(72) Inventors: Werner Krebs, Frankfurt am Main (DE); Horst Krämer, Frankfurt am Main (DE); Manfred Rüffer, Frankfurt am Main (DE); Stephan Schlicht, Frankfurt am Main (DE); Jörg Loke, Frankfurt am Main (DE); Zdenek Rozsypal, Frankfurt am Main (DE); Jaroslav Masek, Frankfurt am Main (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 267 days.

(21) Appl. No.: 16/758,614

(22) PCT Filed: Oct. 15, 2018

(86) PCT No.: PCT/EP2018/078042
§ 371 (c)(1),
(2) Date: Apr. 23, 2020

(87) PCT Pub. No.: WO2019/081247
PCT Pub. Date: May 2, 2019

(65) Prior Publication Data
US 2021/0179048 A1      Jun. 17, 2021

(30) Foreign Application Priority Data
Oct. 25, 2017   (DE) ...................... 10 2017 219 030.2

(51) Int. Cl.
*B60T 11/26* (2006.01)
*B60T 11/32* (2006.01)
(Continued)

(52) U.S. Cl.
CPC ............. *B60T 11/26* (2013.01); *B60T 11/323* (2013.01); *B60T 17/222* (2013.01); *B60T 11/28* (2013.01); *B60Y 2400/81* (2013.01)

(58) Field of Classification Search
CPC .......... B60T 11/22; B60T 11/26; B60T 11/28; B60T 11/32; B60T 11/323
(Continued)

(56) References Cited

U.S. PATENT DOCUMENTS 2,307,220 A *  1/1943  Hewitt ............... A01K 39/0213
                                                        251/339
3,050,345 A *  8/1962  Zimmer ................ B60T 11/323
                                                       188/1.11 R
(Continued)

FOREIGN PATENT DOCUMENTS

CN      110770103 B  *  6/2022  ............. B60T 11/22
DE      3801527 A       8/1988
(Continued)

OTHER PUBLICATIONS

International Search Report and Written Opinion for International Application No. PCT/EP2018/078042, dated Jan. 30, 2019, with partial English translation, 10 pages.
(Continued)

*Primary Examiner* — Thomas J Williams
(74) *Attorney, Agent, or Firm* — RatnerPrestia

(57) ABSTRACT

A fluid container for supplying a consuming device with a working fluid, including at least one connector piece having a shut-off valve arranged therein for preventing undesired escaping of the working fluid from the fluid container. In order to increase safety against undesired emptying of the fluid container, it is provided that the valve closure body, in the closed state of the shut-off valve, is accommodated in the fluid container completely inside a contour formed by an
(Continued)

outer edge of the connector piece, and provision is made, for support against the valve closure body, of a support, which, upon insertion of the connector piece into the receiving seat, engages at least regionally into the connecting duct and in this way displaces the valve closure body in the connecting duct.

4 Claims, 2 Drawing Sheets

(51) Int. Cl.
  *B60T 17/22* (2006.01)
  *B60T 11/28* (2006.01)
(58) Field of Classification Search
  USPC .......................................................... 60/585
  See application file for complete search history.

(56) References Cited

U.S. PATENT DOCUMENTS

| | | | | |
|---|---|---|---|---|
| 3,206,933 | A * | 9/1965 | Dega | B60T 11/22 141/346 |
| 3,566,844 | A * | 3/1971 | Occhiodori | A01K 7/06 119/71 |
| 3,879,013 | A * | 4/1975 | Hajek, Jr. | F16K 15/18 251/149.6 |
| 4,137,911 | A * | 2/1979 | Jousson | A61H 13/005 601/162 |
| 4,934,144 | A | 6/1990 | Larin | |
| 5,302,006 | A | 4/1994 | Castel | |
| 6,928,814 | B2 * | 8/2005 | Lange | B60T 11/26 60/585 |
| 9,656,645 | B2 | 5/2017 | Krebs et al. | |
| 10,131,334 | B2 | 11/2018 | Krebs et al. | |
| 10,549,740 | B2 | 2/2020 | Schnittger et al. | |
| 2004/0148931 | A1 | 8/2004 | Lange | |
| 2007/0090206 | A1 | 4/2007 | Barch et al. | |
| 2016/0075317 | A1 | 3/2016 | Lemke et al. | |

FOREIGN PATENT DOCUMENTS

| | | | |
|---|---|---|---|
| DE | 3912110 A1 | 10/1990 | |
| DE | 102014207839 A1 | 10/2014 | |
| DE | 102014213709 A1 | 1/2016 | |
| EP | 0340186 A1 | 11/1989 | |
| EP | 1514758 A1 | 3/2005 | |
| EP | 2216220 A1 | 8/2010 | |
| EP | 3124430 A1 | 2/2017 | |
| EP | 3418141 A1 | 12/2018 | |
| EP | 3418141 A1 * | 12/2018 | ............. B60T 11/22 |
| FR | 2353008 A1 | 12/1977 | |
| GB | 331700 | 7/1930 | |
| GB | 787339 | 12/1957 | |
| GB | 1486704 | 9/1977 | |
| JP | 54135182 U | 9/1979 | |
| JP | 56117321 U | 9/1981 | |
| JP | 58014397 U | 1/1983 | |
| JP | 5827635 U | 2/1983 | |
| JP | 2004536744 A | 12/2004 | |
| JP | 2014150816 A | 8/2014 | |
| JP | 2015153503 A | 8/2015 | |
| KR | 2019930000667 U | 1/1993 | |
| WO | 2008047288 A2 | 4/2008 | |
| WO | 2017076889 A1 | 5/2017 | |

OTHER PUBLICATIONS

International Search Report and Written Opinion for International Application No. PCT/EP2018/0708042, dated Jan. 30, 2019, 15 pages (German).
Japanese Notice of Reasons for Refusal for Japanese Application No. 2020-523396, dated Jul. 30, 2021, with translation, 9 pages.
Korean Notification of Reason for Refusal for Korean Application No. 10-2020-7011869, dated Jan. 24, 2022, with translation, 13 pages.
Korean Notification of Reason for Refusal for Korean Application No. 10-2020-7011869, dated Jul. 14, 2021, with translation, 13 pages.
Chinese Office Action for Chinese Application No. 201880069501.1, dated Oct. 9, 2021, with translation, 10 pages.
German Search Report for German Application No. 10 2017 219 030.2, dated Feb. 9, 2021 with partial translation, 8 pages.
Indian Examination Report for Indian Application No. 202047017601, dated Feb. 1, 2021 with translation, 6 pages.
Brazilian Office Action for Brazilian Application No. 112020007734-8, dated Sep. 7, 2022 with partial translation, 7 pages.
Korean Decision for Grant a Patent for Korean Application No. 10-2020-7011869, dated Nov. 14, 2022 with translation, 4 pages.
German Examination Report for German Application No. 18 796 369.9, dated Nov. 25, 2022 with translation, 7 pages.

* cited by examiner

FLUID RESERVOIR WITH A STOP VALVE

CROSS REFERENCE TO RELATED APPLICATIONS

This application is the U.S. National Phase Application of PCT International Application No. PCT/EP2018/078042, filed Oct. 15, 2018, which claims priority to German Patent Application No. 10 2017 219 030.2, filed Oct. 25, 2017, the contents of such applications being incorporated by reference herein.

FIELD OF THE INVENTION

The invention relates to a fluid container, in particular a brake fluid container for a hydraulic brake system, and to an associated hydraulic consuming device.

BACKGROUND OF THE INVENTION

Generic fluid containers of said type have one or more, normally two, connector pieces which are associated with the individual brake circuits and which are each provided with an internal hydraulic connecting duct and which are inserted into corresponding receiving seats directly on the assigned brake unit or on a separate interface adapter. For safety reasons in particular, there is an obvious requirement of preventing undesired escaping of the combustible brake fluid from the liquid container precisely when the connector pieces are not situated in the receiving seats provided therefor. This may be the case for example with dismounting of the filled fluid container in the event of servicing or with a detachment of the fluid container as a result of an undesired event such as a crash.

For this purpose, it is known in principle to use shut-off valves in the connecting ducts of the connector pieces.

DE 10 2014 207 839 A1, incorporated herein by reference, for example, has disclosed a shut-off valve which is constructed directly in the connecting duct. DE 10 2014 213 709 A1, incorporated herein by reference, has disclosed a further generic shut-off valve, which is designed as a separate valve module for insertion into the connecting duct.

Shut-off valves of said type have a valve closure body which is elongated in the manner of a shaft and which, in the closed valve state, projects outward from the connector piece and consequently from the fluid container. During insertion into the receiving seat, the valve closure body is supported against the base of the receiving seat and is consequently pushed into the fluid container automatically and thereby opens the valve.

In this case, it is considered to be disadvantageous that, in an extreme case, a valve of said type could also be actuated inadvertently, for example by bending or breaking of the valve closure body or some other type of damage thereto, or by undesired support thereof against some other object.

SUMMARY OF THE INVENTION

An aspect of the invention is therefore based on offering a fluid container with further improved safety against undesired emptying.

To solve the problem, an aspect of the invention makes provision for the shut-off valve to be designed such that the valve closure body, in the closed state of the shut-off valve, is accommodated completely inside the fluid container and does not project beyond the outer edge of the connector piece. This effectively prevents the possibility of the valve closure body being inadvertently actuated outside the receiving seat. In order to actuate the shut-off valve in the installed state, an aspect of the invention provides, for support against the valve closure body, a separate support means, which is arranged outside the fluid container in or on the receiving seat, and which, after the insertion of the connector piece into the receiving seat, engages regionally into the connecting duct and in this way displaces the valve closure body in the connecting duct.

According to a first embodiment according to the invention, the support means may be designed as a projection which is formed integrally on the base of the receiving seat. A projection of said type may be produced, for example directly by primary forming or else in a cutting manner, using conventional production and machining methods and offers the advantage that no additional components have to be mounted and assembly errors are excluded.

According to other embodiments according to the invention, the support means may also be provided as a separate component, which is arranged separately in the receiving seat prior to the mounting of the fluid container. This solution offers in particular the advantage that existing products can be adapted to the improved fluid container through simple reworking or easy modification.

According to a particularly inexpensive and easily modifiable embodiment, provision is made in the base of the receiving seat of an in particular conical trough, into which the support means, which is designed as a ball, is inserted.

According to a further embodiment according to the invention, which is able to be reworked just as easily, the support means may be provided as a separate insert part which is fastened in a force-fitting, form-fitting or materially bonded manner in the receiving seat.

For this purpose, according to a preferred refinement of an aspect of the invention, there is provided in the base of the receiving seat a fastening bore on the support means a fastening pin, which engage with one another in a force-fitting manner for the purpose of fixing the support means.

Another refinement of an aspect of the invention provides that the support means is formed to be rounded on the valve closure body side and preferably has a substantially punctiform contact location with respect to the valve closure body. In this way, the friction with respect to the valve closure body and consequently erroneous actuation thereof, for example by tilting, can be reduced. At the same time, the flow resistance for the working fluid flowing through during operation is also reduced and optimized.

An aspect of the invention furthermore claims a consuming device which is provided for use with the fluid container according to an aspect of the invention, in particular a unit for generating brake pressure in a hydraulic motor vehicle brake system, such as for example a master brake cylinder or a hydraulic brake force booster, a hydraulic brake pressure modulation device or any desired combination of the aforementioned.

BRIEF DESCRIPTION OF THE DRAWINGS

Further features, advantages and possible uses of an aspect of the invention will emerge from the following description of several embodiments according to the invention. In this case.

DETAILED DESCRIPTION OF THE PREFERRED EMBODIMENTS

FIG. 1

Figure 1:
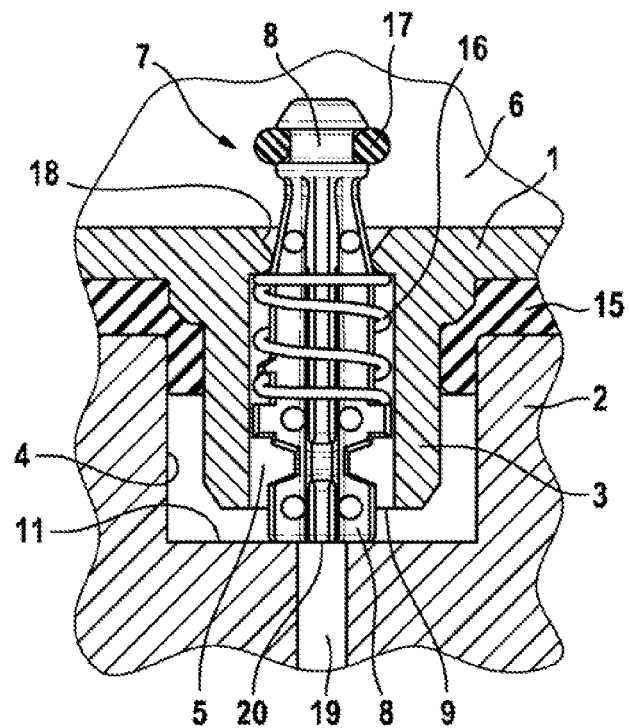
FIG. 1 shows, in a sectional illustration, a partial view of a known generic fluid container with a known embodiment not according to an aspect of the invention of a shut-off valve.

The functional principle is illustrated in FIG. 1 on the basis of a fluid container 1 designed as a brake fluid container and having a known shut-off valve in the installed state.

The fluid container 1 has a connector piece 3 which is formed integrally on its container base and which is inserted into a receiving seat 4 of the consuming device 2, a master brake cylinder in this case, and sealed off with respect to the inner lateral surface of the receiving seat 4 by means of a molded seal 15.

The connector piece 3 is formed to be substantially tubular with an inner connecting duct 5. A shut-off valve 7 is arranged in the connecting duct 5. Via the connecting duct 5 and a passage 19 provided in the receiving seat 4, the working fluid passes from the container interior into the consuming device 2.

The shut-off valve 7 has a valve closure body 8 which is elongated in the manner of a shaft and which is axially displaceable in the connecting duct 5. At its upper end, which is directed toward the container interior 6, a sealing element 17 is arranged on the valve closure body 8, which, in a closed state (not shown here) of the shut-off valve 7, is pressed by the valve spring 16 against a valve seat 18 and in this way blocks the connecting duct 5.

The lower end 20, directed toward the receiving seat 4, of the valve closure body 8 projects outward beyond the outer axial edge 9 of the connector piece 3 and is supported against the base 11 of the receiving seat 4. Consequently, the valve closure body 8 is pushed into the connector piece 3 in the direction of the container interior 6, and the sealing element 17 is lifted off from the valve seat 18.

FIG. 2

Figure 2:
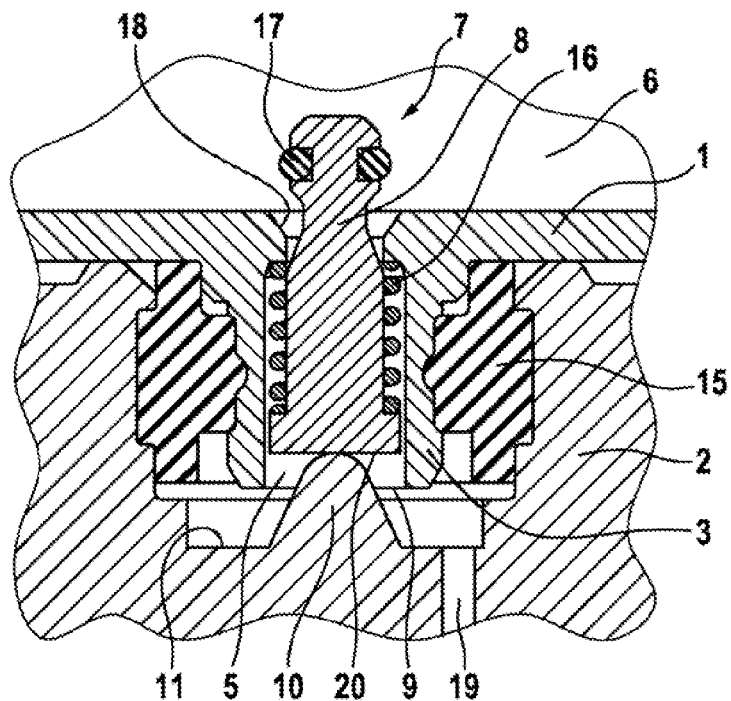
FIG. 2 shows, in a sectional illustration, a partial view of a first embodiment according to an aspect of the invention of the fluid container with the shut-off valve and with a support means integrated in the receiving seat.

FIG. 2 shows a first embodiment according to the invention of the fluid container 1. By contrast to the known above-described embodiment, the valve closure body 8 is designed to be so short that its lower end 20, directed toward the receiving seat 4, is situated completely inside the connecting duct 5 even in the closed state of the shut-off valve 7 and does not project outward beyond the contour which is formed by the outer edge 9 of the connector piece 3.

In order nevertheless to move the valve closure body 8 in the direction of the container interior 6 and to open up the connecting duct 5 hydraulically, a separate support means 10 is provided in the receiving seat 4.

In the embodiment shown, the support means 10 is designed as a projection which is formed integrally on the base 11 of the receiving seat 4 and which extends forward axially in the direction of the connector piece 3. For the purpose of improving the flow behavior of the working fluid and at the same time reducing the friction with respect to the valve closure body, the projection is formed to be substantially conical with a rounded end, thus resulting in a substantially punctiform contact location with respect to the valve closure body 8.

In the installed state, the support means 10 engages directly into the connecting duct 5 of the connector piece 3, and thus moves the valve closure body 8, shortened according to an aspect of the invention, in the direction of the container interior 6 and moves the sealing element 17 off from the valve seat 18.

FIG. 3

Figure 3:
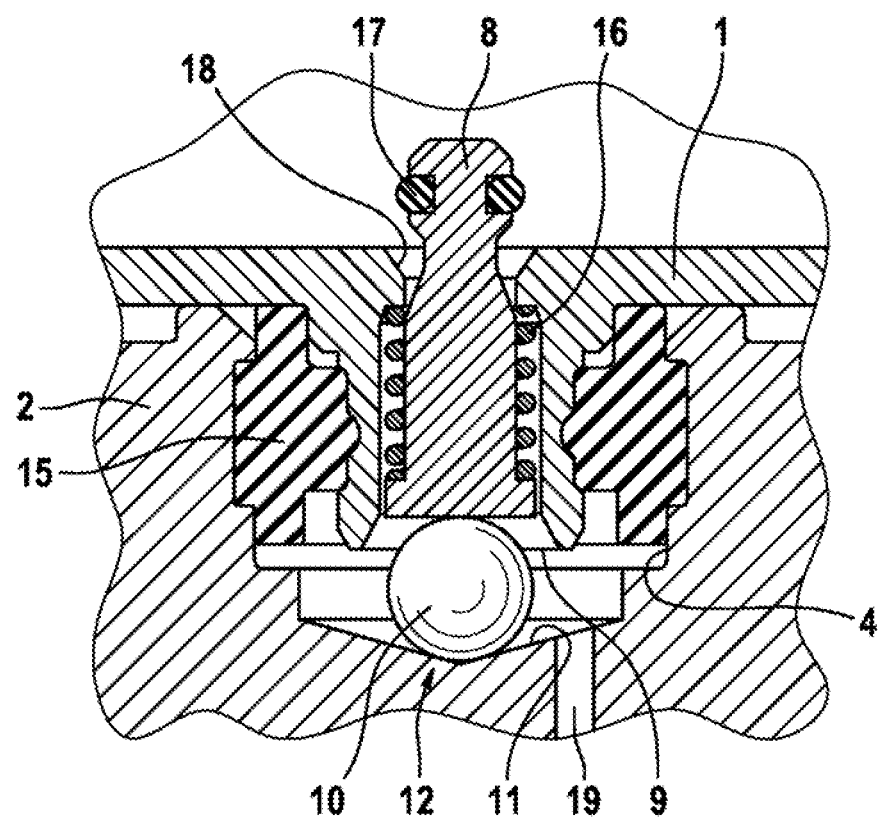
FIG. 3 shows, in a sectional illustration, a partial view of a second embodiment according to an aspect of the invention of the fluid container with the shut-off valve and with a support means which is able to be inserted in the receiving seat.

FIG. 3 shows a second embodiment according to the invention of the fluid container 1. By contrast to the embodiment in FIG. 2, the support means 10 is provided as a ball which is inserted into the receiving seat 4. In order to ensure correct positioning of the ball and the contact thereof with the valve closure body 8, a trough 12 is provided in the base 10 of the receiving seat. In the example shown, the entire base 11 is formed in the manner of a conical trough, whereby a ball inserted therein centers itself automatically by way of the action of gravitational force alone.

FIG. 4

Figure 4:
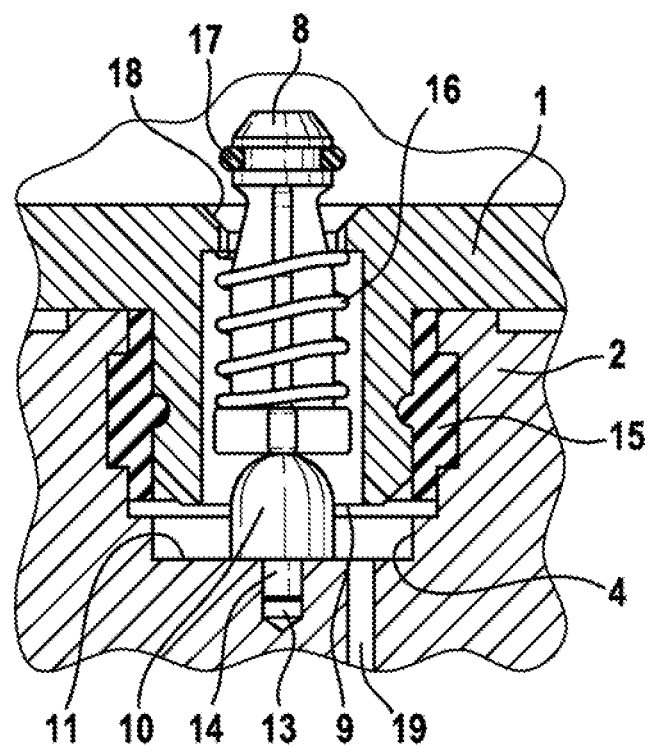
FIG. 4 shows, in a sectional illustration, a partial view of a third embodiment according to an aspect of the invention of the fluid container with the shut-off valve and with a support means which is inserted in a fastened manner in the receiving seat.

FIG. 4 shows a third embodiment according to the invention of the fluid container 1. By contrast to the embodiment in FIG. 2, the support means 10 is provided as a separate insert part, which, however, by contrast to the embodiment in FIG. 3, is fastened in the receiving seat 4.

For this purpose, a fastening bore 13 is formed in the base 11 of the receiving seat 4 and a corresponding fastening pin 14 is formed on the support means 10, which fastening pin is inserted in a force-fitting manner into the fastening bore 13. A reverse principle and a form-fitting connection, for example by means of a thread, or a materially bonded connection by means of adhesive bonding are at any time possible and permissible within an aspect of the invention.

For the purpose of improving the flow behavior of the working fluid and at the same time reducing the friction with respect to the valve closure body, the insert part is formed to be spherically rounded on the valve closure body side.

LIST OF REFERENCE SIGNS

1 Fluid container
2 Consuming device
3 Connector piece
4 Receiving seat
5 Connecting duct
6 Container interior
7 Shut-off valve
8 Valve closure body
9 Edge
10 Support means
11 Base
12 Trough
13 Fastening bore
14 Fastening pin
15 Molded seal
16 Valve spring
17 Sealing element
18 Valve seat
18 Passage
20 End.

The invention claimed is:

1. A fluid container for supplying a consuming device with a working fluid, comprising:

at least one connector piece for insertion into a receiving seat of the consuming device, in the connector piece a connecting duct for the hydraulic connection of a container interior to the consuming device, and a shut-off valve which is arranged in the connecting duct and which serves for blocking the connecting duct, wherein the shut-off valve has a displaceable valve closure body which, upon insertion of the connector piece into the receiving seat, transfers the shut-off valve into an open state automatically by action of force and which, upon removal of the connector piece from the receiving seat, transfers said shut-off valve into a closed state, and wherein the valve closure body, in the closed state of the shut-off valve, is accommodated in the fluid container completely inside a contour formed by an outer edge of the connector piece, and provision is made, for support against the valve closure body, of a support, which, upon insertion of the connector piece into the receiving seat, engages at least regionally into the connecting duct and in this way displaces the valve closure body in the connecting duct, wherein the support is arranged in the receiving seat, the receiving seat has a base with a trough, and the support is a ball which is inserted into the trough.

2. The fluid container as claimed in claim 1, wherein the support has a substantially punctiform contact location with respect to the valve closure body.

3. The fluid container as claimed in claim 2, wherein the support is formed to be rounded toward the valve closure body.

4. A consuming device for use with the fluid container as claimed in claim 1, wherein the receiving seat is arranged in a unit for generating brake pressure in a hydraulic motor vehicle brake system.

\* \* \* \* \*